(12) United States Patent
Breen et al.

(10) Patent No.: US 10,003,266 B2
(45) Date of Patent: Jun. 19, 2018

(54) CONFIGURABLE MULTI-RAIL VOLTAGE REGULATION WITH COUPLED INDUCTOR POWER STEERING

(71) Applicant: DELL PRODUCTS, LP, Round Rock, TX (US)

(72) Inventors: John J. Breen, Harker Heights, TX (US); Guangyong Zhu, Austin, TX (US); Stuart Allen Berke, Austin, TX (US); Abey K. Mathew, Georgetown, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 146 days.

(21) Appl. No.: 15/220,616

(22) Filed: Jul. 27, 2016

(65) Prior Publication Data
US 2018/0034374 A1    Feb. 1, 2018

(51) Int. Cl.
*G06F 9/44*    (2018.01)
*H02M 3/33*    (2006.01)
*H02M 3/335*    (2006.01)

(52) U.S. Cl.
CPC ...... *H02M 3/33507* (2013.01); *G06F 9/4403* (2013.01)

(58) Field of Classification Search
CPC ......... H02M 3/33507; H02M 3/33561; H02M 3/1584; H02H 3/023; G06F 9/4403
See application file for complete search history.

(56) References Cited

U.S. PATENT DOCUMENTS

| 4,318,039 A * | 3/1982 | Abbott ............. H02M 3/33507 323/273 |
| 4,581,690 A * | 4/1986 | Russell ............ H02M 3/33561 363/101 |
| 7,386,864 B2 | 6/2008 | Richardson |
| 2004/0100740 A1* | 5/2004 | Iwashita ................ H02H 3/023 361/18 |
| 2009/0001945 A1* | 1/2009 | Wickersham ....... H02M 3/1584 323/263 |

(Continued)

FOREIGN PATENT DOCUMENTS

EP    1 718 011 A2    11/2006

OTHER PUBLICATIONS

U.S. Appl. No. 14/952,250, filed Nov. 25, 2015.

*Primary Examiner* — Zahid Choudhury
(74) *Attorney, Agent, or Firm* — Larson Newman, LLP (57) ABSTRACT

A voltage regulator circuit comprises a plurality of voltage regulator phases, a first load output coupled to the plurality of voltage regulator phases for providing a first output voltage, a first coupling inductor having a first winding and a second winding, the first winding coupled in series between a first voltage regulator phase of the plurality of voltage regulator phases and the first load output, a second load output coupled to the second winding for providing a second output voltage, and a first switch coupled in series with the second winding. A method comprises detecting a startup event; determining an installed processor type; retrieving a configuration parameter value; providing a first output voltage at a first load output; providing, at a second load output coupled to the second winding, a second output voltage; and controlling a first duty cycle of a first switch coupled in series with the second winding.

17 Claims, 6 Drawing Sheets

(56) References Cited

U.S. PATENT DOCUMENTS

2012/0079391 A1 3/2012 Dantzig et al.
2014/0344600 A1* 11/2014 Breen ................ H02M 3/1584
                                                                                            713/323

* cited by examiner

CONFIGURABLE MULTI-RAIL VOLTAGE REGULATION WITH COUPLED INDUCTOR POWER STEERING

FIELD OF THE DISCLOSURE

The present disclosure generally relates to information handling systems, and more particularly relates to voltage regulation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A voltage regulator circuit includes a plurality of voltage regulator phases, a first load output coupled to the plurality of voltage regulator phases for providing a first output voltage, a first coupling inductor having a first winding and a second winding, the first winding coupled in series between a first voltage regulator phase and the first load output, a second load output coupled to the second winding for providing a second output voltage, and a first switch coupled in series with the second winding. A method includes detecting a startup event; determining an installed processor type; retrieving a configuration parameter value; providing a first output voltage at a first load output; providing, at a second load output coupled to the second winding, a second output voltage; and controlling a first duty cycle of a first switch coupled in series with the second winding.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Different electronic components in an information handling system can require different voltages to operate. Moreover, different variations of the different electronic components can require different sets of voltages than one another. Thus, a power supply unit (PSU) designed specifically for one set of voltages cannot readily be used for another set of voltages, thereby inhibiting production and reconfiguration of different variations.

The PSU may include a voltage regulator (VR) circuit having a plurality of VR subcircuits or phases. The phases may include series inductors having a primary winding to couple power to a secondary winding, wherein the VR phase may provide power for a first load output from a direct connection to the primary winding and for a second load output from a connection to the secondary winding which obtains its power from inductive coupling from the primary winding. The amount of power steered from the primary winding to the secondary winding can be controlled by controlling the operation of a switch coupled to the secondary winding.

Figure 1:
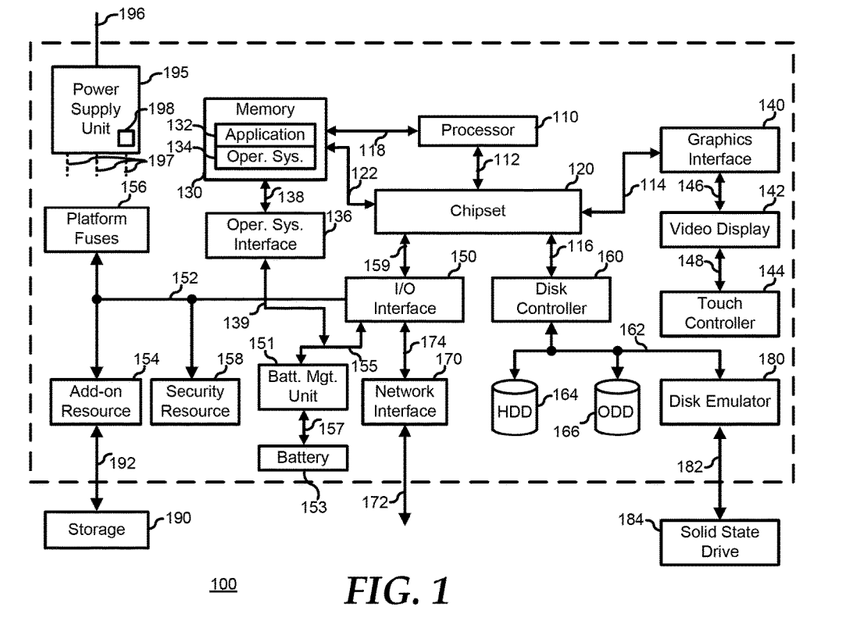
FIG. 1 is a block diagram illustrating an information handling system according to an embodiment of the present disclosure.

FIG. 1 shows a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, include an operating system interface 136, a disk controller 160, a disk emulator 180, an input/output (I/O) interface 150, and a network interface 170. Processor 110 is connected to chipset 120 via processor interface 112. Processor 110 is connected to memory 130 via a memory bus 118. Memory 130 is connected to chipset 120 via a memory bus 122. Memory 130 comprises memory storing an application 132 and memory storing an operating system 134. Memory 130 is connected to operating system interface 136 by operating system interface connection 138. Operating system interface 136 is connected to a connection 155 between I/O interface 150 and battery management unit 151 by connection 139. Battery management unit 151 is connected to battery 153 via battery connection 157. Graphics interface 140 is connected to chipset 120 via a graphics interface 114, and provides a video display output 146 to a video display 142. Video display 142 is connected to a touch controller 144 via touch controller connection 148. An example of memory 130 includes random access memory (RAM) such as static RAM (SRAM), dynamic RAM (DRAM), non-volatile RAM (NV-RAM), or the like, read only memory (ROM), another type of memory, or a combination thereof.

Disk controller 160 is connected to chipset 120 via disk controller interface 116. I/O interface 150 is connected to chipset 120 via an I/O channel 159. An example of I/O channel 166 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 162 includes a USB interface, an IEEE 1194 (Firewire) interface, a proprietary interface, or a combination thereof. Alternatively, solid-state drive 184 can be disposed within information handling system 100.

I/O interface 150 is connected to a network interface 170 via connection 174. Network interface 170 connects to a network via network connection 172. I/O interface 150 includes a peripheral interface 152 that connects the I/O interface to an add-on resource 154, to a security resource 158, and to platform fuses 156. Add-on resource 154 can connect to, for example, external storage 190 via external connection 192. Peripheral interface 152 can be the same type of interface as I/O channel 159, or can be a different type of interface. As such, I/O interface 170 extends the capacity of I/O channel 159 when peripheral interface 152 and the I/O channel are of the same type, and the I/O interface translates information from a format suitable to the I/O channel to a format suitable to the peripheral channel 152 when they are of a different type. Add-on resource 154 can include a data storage system, an additional graphics interface, a network interface card (NIC), a sound/video processing card, another add-on resource, or a combination thereof. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 110, in another suitable location, or a combination thereof. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channel 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Power supply unit (PSU) 195 provides power to other elements of information handling system 100. PSU 195 receives a power input 196 and provides power outputs 197. PSU 195 comprises a voltage regulator (VR) circuit 198, which may include a plurality of voltage regulator phases providing a directly connected output and an inductively coupled output, as will be discussed below in more detail with respect to other FIGs. A voltage regulator provides a regulated voltage at a current sufficient to power at least a portion of the information handling system. A voltage regulator may be comprised of a plurality of voltage regulator subcircuits, called phases, each of which may provide a portion of the desired current at the regulated voltage, such that the voltage regulator subcircuits collectively provide the desired current, for example, by having their outputs connected together to provide a common load output.

However, different configurations of information handling systems may require more or less current at a given regulated voltage or a greater or lesser number of regulated voltages. Thus, a fixed configuration of output voltages and current capacities may impair accommodation of a range of different information handling system configurations. Thus, a technique that can flexibly accommodate a range of different information handling system configurations by providing reconfigurable outputs of selectable voltages and current capacities, which may be implemented as described below, can improve an information handling system.

Figure 2:
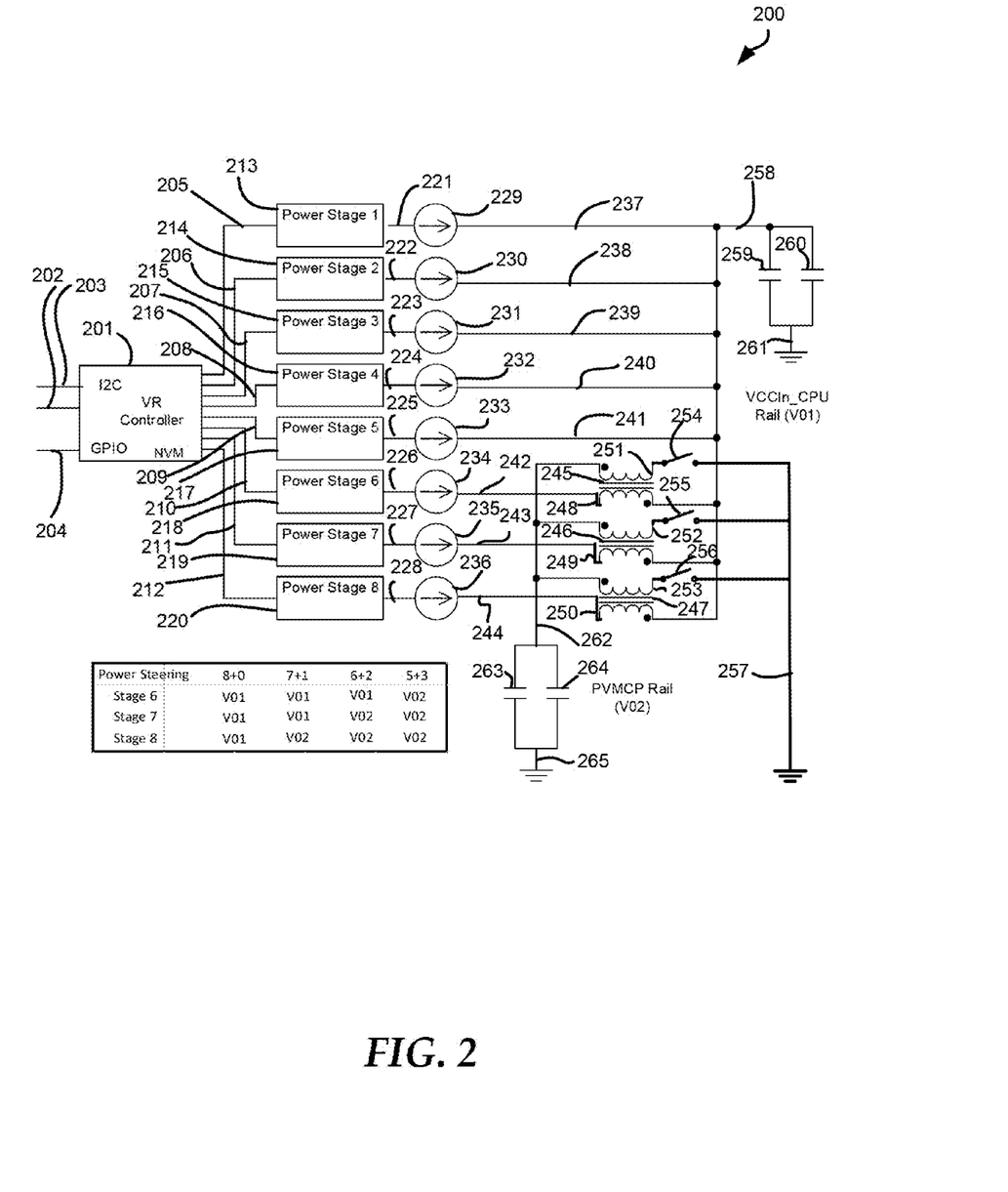
FIG. 2 is a schematic diagram illustrating a voltage regulator circuit according to an embodiment of the present disclosure.

FIG. 2 shows a voltage regulator circuit according to an embodiment of the present disclosure. The voltage regulator circuit includes a voltage regulator (VR) controller circuit 201 and a plurality of phases. In the example shown, a first phase includes power stage 213 and driver 229, a second phase includes power stage 214 and driver 230, a third phase includes power stage 215 and driver 231, a fourth phase includes power stage 216 and driver 232, a fifth phase includes power stage 217 and driver 233, a sixth phase includes power stage 218 and driver 234, a seventh phase includes power stage 219 and driver 235, and an eighth phase includes power stage 220 and driver 236.

As used herein, the term phase refers to a voltage regulator subcircuit that can be connected in parallel with other voltage regulator subcircuits, as shown in FIG. 2. The term phase can also refer to a temporal relationship to a periodic waveform, such as an alternating current (AC) waveform or a periodic waveform produced by switching current through an inductor. The phrase power stage refers to a portion of a phase that provides voltage regulation and provides a drive signal to drive a driver for outputting a regulated voltage. The term driver refers to a portion of a phase that controls delivery of the regulated voltage according to the drive signal provided by the power stage.

For at least one of the phases, an inductor such as one of inductors 245, 246, and 247, is connected in series with the output of the corresponding driver for the phase. The primary winding of such an inductor has a primary input terminal connected to the output of the driver of the phase and a primary output terminal connected to a primary voltage output of the voltage regulator. The primary output terminals of several inductors of several phases may be connected together to provide higher primary output current capability than from a single inductor of a single phase. The primary output terminals of one or more inductors of one or more phases may be connected together with the outputs of one or more drivers of one or more other phases that do not include a series inductor as described above.

For a phase which includes the series inductor described above, a secondary winding of the inductor can be used to steer power from the primary output terminal to a secondary output terminal. A first secondary winding terminal is coupled to ground. A second secondary winding terminal is coupled to the secondary output terminal. A switch is interposed in series with the secondary winding to allow interruption of the secondary winding circuit. The switch may be a controllable switch which may be controlled by a control signal applied to a control input terminal, for example, a transistor controllable by a control signal applied to a gate terminal of the transistor.

An inter-integrated-circuit (I2C) bus includes a data line 202 and a clock line 203. Data line 202 and clock line 203 are connected to VR controller circuit 201. General purpose input-output (GPIO) line 204 is connected to VR controller circuit 201. VR controller circuit 201 provides power stage control signal to power stages 213, 214, 215, 216, 217, 218, 219, and 220 via power stage control lines 205, 206, 207, 208, 209, 210, 211, and 212, respectively. Power stages 213, 214, 215, 216, 217, 218, 219, and 220 provide driver control signals to drivers 229, 230, 231, 232, 233, 234, 235, and 236 via driver control lines 221, 222, 223, 224, 225, 226, 227, and 228, respectively.

In the example shown in FIG. 2, drivers 229, 230, 231, 232, and 233 are configured to provide a directly connected output, as their driver outputs 237, 238, 239, 240, and 241, respectively, are connected together with each other and are connected as a first load output 258. The first load output 258 is connected to a first terminal of capacitor 259 and to a first terminal of capacitor 260. A second terminal of capacitor 259 and a second terminal of capacitor 260 are connected to ground 261.

In the example shown in FIG. 2, drivers 234, 235, and 236 are configured to provide a directly connected output, via a primary winding of each of series inductors 245, 246, and 247, respectively. By operation of switches 254, 255, and 256, secondary windings 251, 252, and 253 of series inductors 245, 246, and 247 can provide power magnetically coupled from primary windings 248, 249, and 250, respectively, to second load output 262 as an inductively coupled output.

Driver output 242 of driver 234 is connected to a primary winding input terminal of primary winding 248 of series inductor 245. A primary winding output terminal of primary winding 248 is connected to first load output 258. Driver output 243 of driver 235 is connected to a primary winding input terminal of primary winding 249 of series inductor 246. A primary winding output terminal of primary winding 249 is connected to first load output 258. Driver output 244 of driver 236 is connected to a primary winding input terminal of primary winding 250 of series inductor 247. A primary winding output terminal of primary winding 250 is connected to first load output 258.

Ground 257 is connected to a first terminal of each of switches 254, 255, and 256. A second terminal of switch 254 is connected to a first secondary winding terminal of secondary winding 251 of series inductor 245. A second secondary winding terminal of secondary winding 251 of series inductor 245 is connected to second load output 262 as an inductively coupled output. A second terminal of switch 255 is connected to a first secondary winding terminal of secondary winding 252 of series inductor 246. A second secondary winding terminal of secondary winding 252 of series inductor 246 is connected to second load output 262 as an inductively coupled output. A second terminal of switch 256 is connected to a first secondary winding terminal of secondary winding 253 of series inductor 247. A second secondary winding terminal of secondary winding 253 of series inductor 247 is connected to second load output 262 as an inductively coupled output.

Second load output 262 is connected to a first terminal of capacitor 263 and to a first terminal of capacitor 264. A second terminal of capacitor 263 and a second terminal of capacitor 264 are connected to ground 265.

By controlling the duty cycles of switches 254, 255, and 256, a second load output voltage of second load output 262 can be controlled. At one extreme, a zero percent duty cycle of switches 254, 255, and 256 effectively disables the secondary windings 251, 252, and 253, resulting in zero voltage at second load output 262. As the duty cycle is increased, the second load output voltage can be increased as power is transferred from the primary windings 248, 249, and 250 to secondary windings 251, 252, and 253.

Switches 254, 255, and 256 are located between ground potential 257 and secondary windings 251, 252, and 253, respectively, in FIG. 2. Alternatively, as will be illustrated in FIGS. 3 and 4, one terminal of each secondary winding can be connected directly to a ground potential, and the switches can be located on the opposite side of the secondary windings, toward the second load output, such as second load output 262 of FIG. 2.

Figure 3:
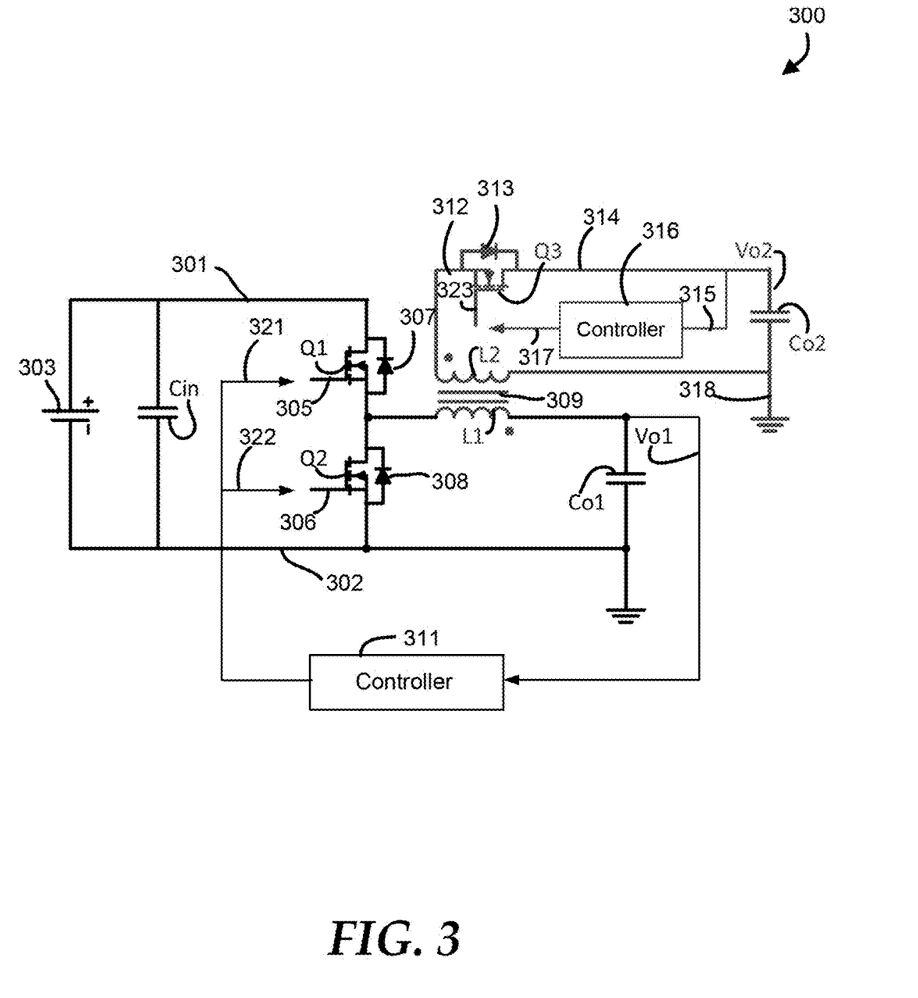
FIG. 3 is a schematic diagram illustrating a voltage regulator circuit according to an embodiment of the present disclosure.

FIG. 3 shows a voltage regulator circuit according to an embodiment of the present disclosure. An input direct current (DC) power supply 303 provides an input voltage between positive input voltage rail 301 and ground potential 302. The positive output of input DC power supply 303 is connected to positive input voltage rail 301. The negative output of input DC power supply 303 is connected to ground potential 302. A first terminal of input capacitor Cin is connected to positive input voltage rail 301. A second terminal of input capacitor Cin is connected to ground potential 302. Positive input voltage rail 301 is connected to a first terminal of high-side transistor Q1 and to a cathode terminal of diode 307. A second terminal of high-side transistor Q1 is connected to the anode terminal of diode 307, to a first terminal of low-side transistor Q2, to a cathode terminal of diode 308, and to a primary winding input terminal of primary winding L1 of series inductor 309. A second terminal of low-side transistor Q2 is connected to the anode terminal of diode 308 and to ground potential 302.

A primary winding output terminal of primary winding L1 of series inductor 309 is connected to a first load output to provide a first load output voltage i. The first load output is connected to a first terminal of output capacitor Co1 and to an input of controller 311. A control output 321 is provided from controller 311 to a gate terminal of transistor Q1 to control operation of transistor Q1. A control output 322 is provided from controller 311 to a gate terminal of transistor Q2 to control operation of transistor Q2.

Series inductor 309 can inductively couple power from primary winding L1 to secondary winding L2. Primary winding L1 converts electrical power from current flowing through primary winding L1 into magnetic energy in a core of series inductor 309. Secondary winding L2 can obtain power from the magnetic energy in the core of series inductor 309 and convert the power to provide electrical power to a circuit connected to secondary winding L2. A first terminal of secondary winding L2 is connected to ground potential 318. A second terminal of secondary winding L2 is connected to a first terminal of transistor Q3 and to an anode terminal of diode 313. A second terminal of transistor Q3 is connected to a cathode terminal of diode Q3 and to a second load output to provide a second load output voltage Vo2. The second load output is connected to a first terminal of output capacitor Co2 and to an input 315 of controller 316. Controller 316 provides a control output 317 to the gate terminal 323 of transistor Q3 to control the operation of transistor Q3. For example, controller 316 can increase the duty cycle of transistor Q3 by increasing the time the transistor Q3 is on compared to the time the transistor Q3 is off in order to raise the second load output voltage Vo2. Controller 316 can decrease the duty cycle of transistor Q3 by decreasing the time the transistor Q3 is on compared to the time the transistor Q3 is off in order to lower the second load output voltage Vo2.

While high-side transistor Q1 and diode 307, low-side transistor Q2 and diode 308, and transistor Q3 and diode 313 are described below as separate devices, it should be understood that a transistor, for example, a metal oxide semiconductor field effect transistor (MOSFET), and a diode may be incorporated in a single transistor semiconductor die and internally connected as shown. Alternatively, one or more transistors and one or more diodes may be implemented on separate dies.

Figure 4:
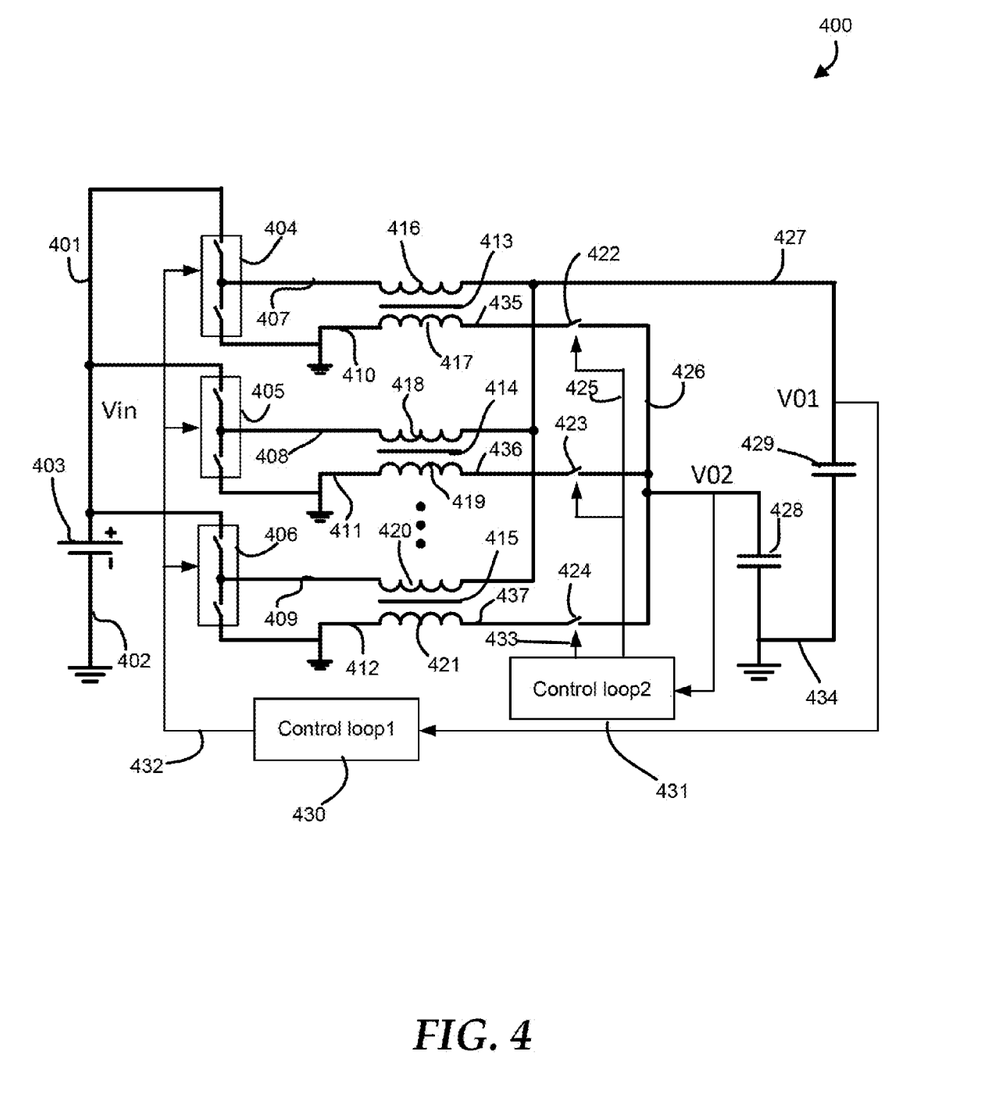
FIG. 4 is a schematic diagram illustrating a voltage regulator according to an embodiment of the present disclosure.

FIG. 4 shows a voltage regulator according to an embodiment of the present disclosure. Input DC power supply 403 provides an input DC power supply voltage between positive input voltage rail 401 and ground potential 402. A positive terminal of input DC power supply 403 is connected to positive input voltage rail 401. A negative terminal of input DC power supply 403 is connected to ground potential 402. Positive input voltage rail 401 is connected to a first terminal of a high-side switch of driver 404, to a first terminal of a high-side switch of driver 405, and to a first terminal of a high-side switch of driver 406.

A second terminal of the high-side switch of driver 404 is connected to a first terminal of a low-side switch of driver 404 and to a primary winding input terminal of primary winding 416 of series inductor 413 at node 407. A second terminal of the high-side switch of driver 405 is connected to a first terminal of a low-side switch of driver 405 and to a primary winding input terminal of primary winding 418 of series inductor 414 at node 408. A second terminal of the high-side switch of driver 406 is connected to a first terminal of a low-side switch of driver 406 and to a primary winding input terminal of primary winding 420 of series inductor 415 at node 409. A primary winding output terminal of primary winding 416 of series inductor 413 is connected to a first load output 427. A primary winding output terminal of primary winding 418 of series inductor 414 is connected to a first load output 427. A primary winding output terminal of primary winding 420 of series inductor 415 is connected to a first load output 427. First load output 427 provides first load output voltage VO1 and is connected to a first terminal of capacitor 429 and to an input of control loop controller 430. Control loop controller 430 provides a plurality of outputs 432 to drivers 404, 405, and 406 to control the operation of the high-side switches and low-side switches of drivers 404, 405, and 406. A second terminal of capacitor 429 is connected to ground potential 434.

A second terminal of the low-side switch of driver 404 is connected to ground potential 410. A second terminal of the low-side switch of driver 405 is connected to ground potential 411. A second terminal of the low-side switch of driver 406 is connected to ground potential 412. A first terminal of second winding 417 of series inductor 413 is connected to ground potential 410. A first terminal of second winding 419 of series inductor 414 is connected to ground potential 411. A first terminal of second winding 421 of series inductor 415 is connected to ground potential 412. A second terminal of second winding 417 of series inductor 413 is connected to a first terminal of switch 422 at node 435. A second terminal of second winding 419 of series inductor 414 is connected to a first terminal of switch 423 at node 436. A second terminal of second winding 421 of series inductor 415 is connected to a first terminal of switch 424 at node 437. A second terminal of switch 422 is connected to a second load output 426. Second load output 426 provides second load output voltage VO2 and is connected to a first terminal of capacitor 428 and to an input of control loop controller 431. Control loop controller 430 provides a plurality of outputs 433 and 425 to control terminals of switches 422, 423, and 424 to control the operation of switches 422, 423, and 424. A second terminal of capacitor 428 is connected to ground potential 434.

Control loop controller 431 can implement a pattern of switching switches 422, 423, and 424 for providing, for example, coarse and fine control over first load output voltage VO1 at first load output 427 and second load output voltage VO2 at second load output 426. For example, depending on the voltage and current requirements of second load output 426, control loop controller 431 can close one or more of switches 422, 423, and 424 to utilize power from one or more of second windings 417, 419, and 421, respectively. For lighter power requirements, one or more of switches 422, 423, and 424 can be left open to allow the full power of one or more phases to be delivered to first load output 427 without diversion of power to second load output 426 from a phase for which at least one of switches 422, 423, and 424 is left open. At least one embodiment can use different components among phases, such as inductors with different turns ratios of the number of primary winding turns to the number of secondary winding turns or with different core materials or configurations, which can provide different amounts of coupling for the different inductors. Thus, switches 422, 423, and 424 can, but need not, provide symmetry and equal amount of coupled power among their respective phases. For example, operation of switch 424 may provide more power steering to second load output 426 than operation of switch 423, which may provide more power steering to second load output 426 than operation of switch 422.

However, besides enabling and disabling magnetic coupling of power to second load output 426 on a phase-by-phase basis, with respective phases either enabled or disabled, a fine level of granularity of control of power delivered to second load output 426 can be obtained by controlling the on-time of any of switches 422, 423, and 424 that are used (e.g., not merely left open over a long duration, such as the entire duration of system operation). For example, switches 422, 423, and 424 can be turned on (e.g., closed) for a first period of time and turned off (e.g., opened) for a second period of time. The amount of on-time can be controlled with a fine level of granularity to control the power steered to the second load 426 with a fine level of granularity.

Switches 422, 423, and 424 can be switched on and off in relation to a polarity of voltage across the secondary windings of their respective inductors, as induced by changing current through the primary windings. The changing current through the primary windings can be controlled by the switching of the high-side switches and low-side switches in drivers 404, 405, and 406. While the switching of drivers 404, 405, and 406 can be controlled to provide the desired voltage and current at first load output 427, switches 422, 423, and 424 can be controlled in response to the polarity of the voltage across the secondary windings of inductors 413, 414, and 415, as determined by the switching of drivers 404, 405, and 406, to charge or maintain charge on capacitor 428 and to provide power to second load output 426. Within the temporal portions of the waveforms at nodes 435, 436, and 437 of the proper polarity to be used for second load output 426, switches 422, 423, and 424 can be closed for a period of time to provide a desired amount of power steering to second load output 426. The period of time may be same for each of switches 422, 423, and 424, or the period of time for one or more of switches 422, 423, and 424 may be different from the period of time for one or more other of switches 422, 423, and 424. The periods of time of switches 422, 423, and 424 may be concurrent, overlapping, or non-overlapping. Within temporal portions of the waveforms at nodes 435, 436, and 437 of the opposite polarity from the proper polarity to be used for second load output 426, switches 422, 423, and 424 can be opened, for example, to avoid reverse current flow that would diminish the amount of power steered to second load output 426. In another embodiment, switches 422, 423, and 424 could be closed for the entire period of time of proper polarity and a portion of the period of time of opposite polarity to control the amount of power steered to second load 426.

Figure 5:
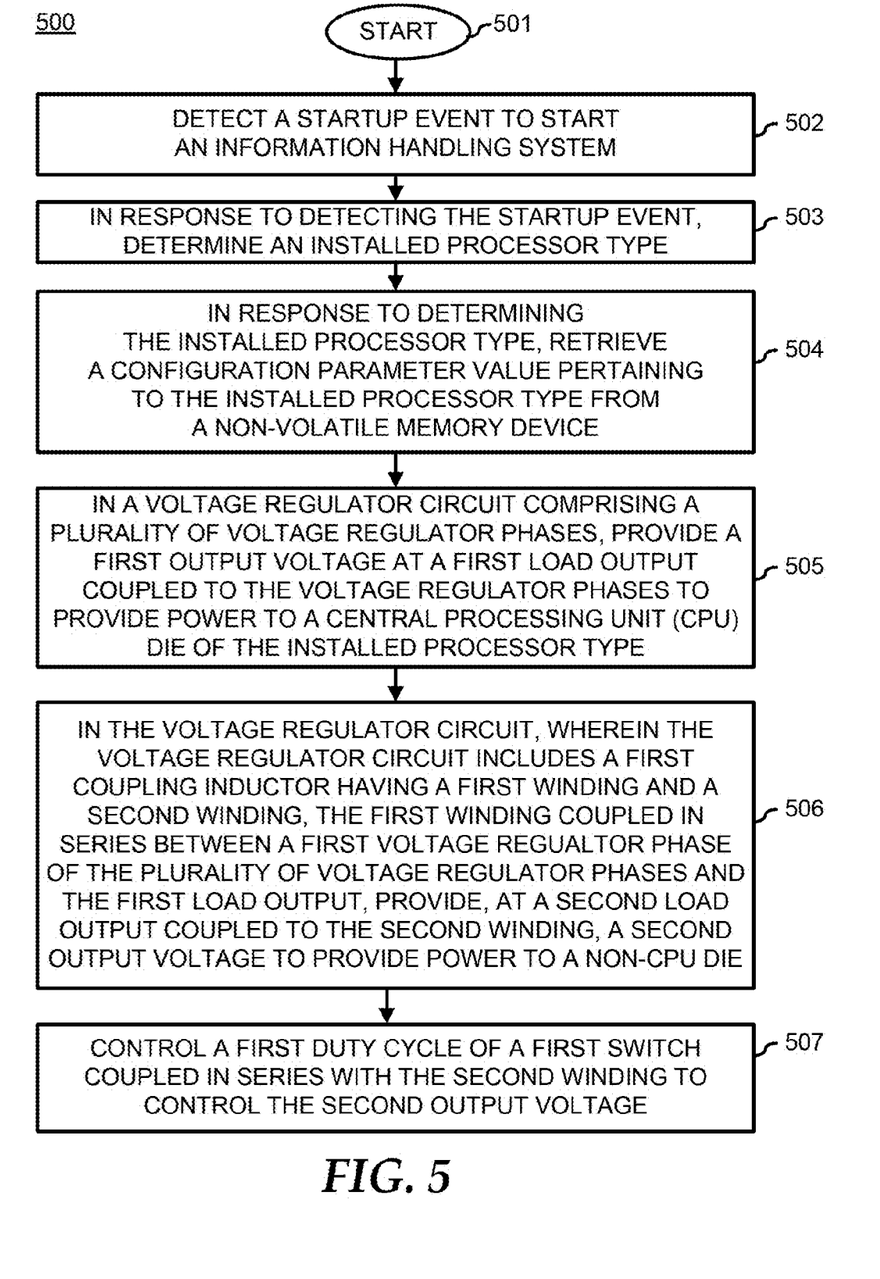
FIG. 5 is a schematic diagram illustrating a method according to an embodiment of the present disclosure.

FIG. 5 shows a method 500 that begins in block 501 and continues to block 502. In block 502, a startup event to start an information handling system is detected. From block 502, method 500 continues to block 503 where, in response to detecting the startup event, an installed processor type is determined. From block 503, method 500 continues to block 504 where, in response to determining the installed processor type, a configuration parameter value pertaining to the installed processor type is retrieved from a non-volatile memory device. From block 504, method 500 continues to block 505 where in a voltage regulator circuit including a plurality of voltage regulator phases, a first output voltage is provided at a first load output coupled to the plurality of voltage regulator phases to provide power to a central processing unit (CPU) die of the installed processor type. From block 505, method 500 continues to block 506 wherein the voltage regulator circuit includes a first coupling inductor having a first winding and a second winding, with the first winding coupled in series between a first voltage regulator phase of the plurality of voltage regulator phases and the first load output, a second output voltage is provided at a second load output coupled to the second winding to provide power to a non-CPU die. From block 506, method 500 continues to block 507. At block 507, a first duty cycle of a first switch coupled in series with the second winding is controlled to control the second output voltage.

Figure 6:
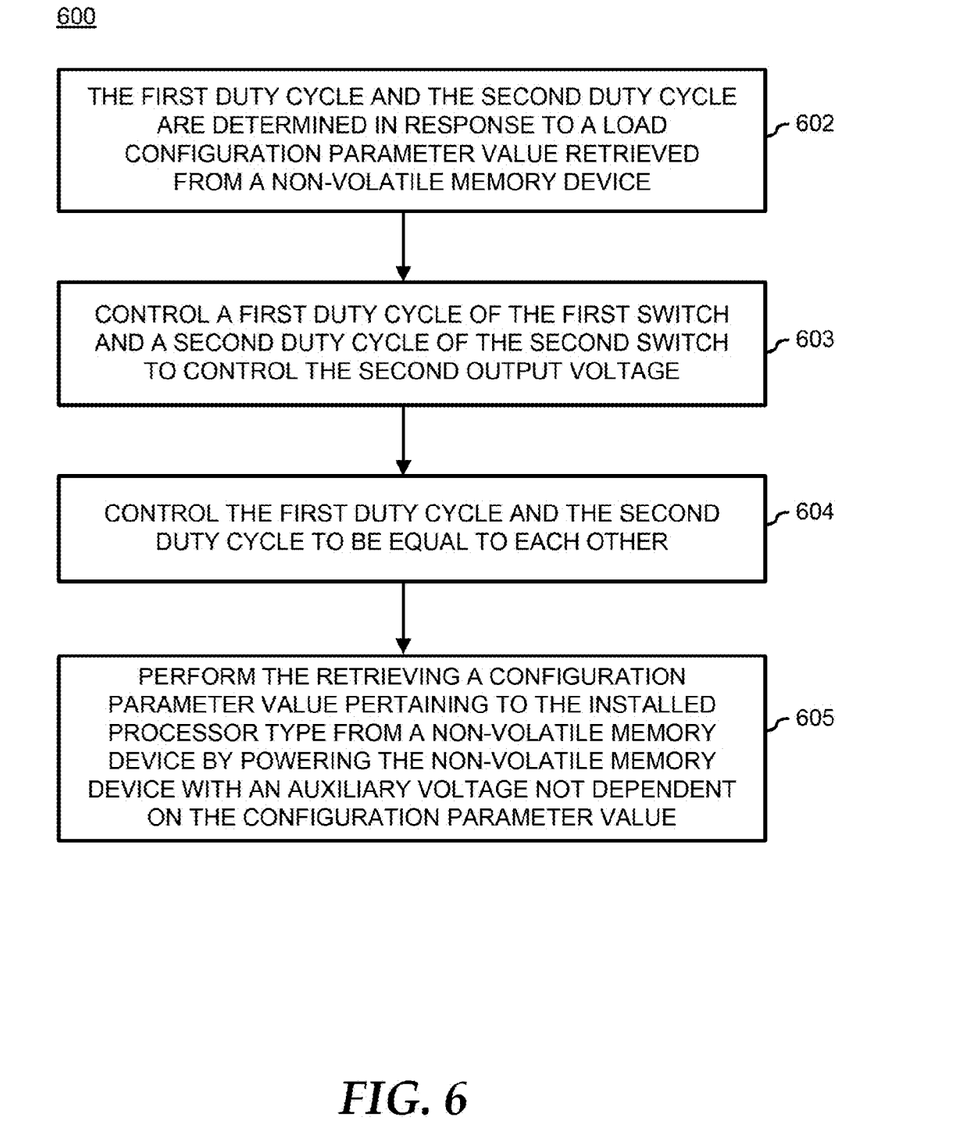
FIG. 6 is a flow diagram illustrating blocks that may be implemented in conjunction with the method of FIG. 5 according to various embodiments of the present disclosure.

FIG. 6 is a flow diagram illustrating blocks that may be implemented in conjunction with the method of FIG. 5 according to various embodiments of the present disclosure. Optional blocks 600 comprise blocks 602, 603, 604, and 605. In block 602, the first duty cycle and the second duty cycle are determined in response to a load configuration parameter value retrieved from a non-volatile memory device. As an example, after block 504 of FIG. 5, where a configuration parameter value is retrieved from the non-volatile memory device, the first duty cycle and the second duty cycle can be determined in response to a load configuration parameter value retrieved from the non-volatile memory device.

In block 603, a first duty cycle of the first switch and a second duty cycle of the second switch are controlled to control the second output voltage. As an example, block 603 may be implemented in place of block 507 of FIG. 5. In block 604, the first duty cycle and the second duty cycle are controlled to be equal to each other. In another embodiment, the first duty cycle and the second duty cycle can be different than each other.

In block 605, the retrieving the configuration parameter value pertaining to the installed processor type from the non-volatile memory device is performed by powering the non-volatile memory device with an auxiliary voltage not dependent on the configuration parameter value. As an example, block 504 of FIG. 5 can be performed according to block 605 of FIG. 6. The auxiliary voltage can be made available initially upon detecting the startup event to start the information handling system of block 502 of FIG. 5 without requiring the voltage regulator circuit whose configuration can depend on the configuration parameter value to be fully operational at the time block 504 is performed.

Various embodiments may be applied to various systems that utilize a plurality of supply voltages. Some sets of electronic components are grouped together in a manner that results in interrelated parameters between them. For example, various central processing unit (CPU) dies and non-CPU dies may be combined on a Multi-Chip Package (MCP), with examples being CPU dies only, CPU dies with integrated network interconnect fabric dies, CPU dies with integrated field-programmable gate array (FPGA) dies, and CPU dies with integrated graphics processor dies.

A non-CPU die can require a separate voltage rail to provide core power to the non-CPU die (plus two additional low current point-of-load (POL) power supplies for miscellaneous and input-output (IO) power). A CPU die only variant and some variants with CPU dies and non-CPU dies may not require a separate core voltage rail.

A voltage rail may require a multiple phase voltage regulator (VR). For example, a CPU die main core voltage rail may require a six-phase VR, and a non-CPU MCP device core voltage rail may require a three-phase VR. However, by inductively coupling power from a directly connected load output to an inductively coupled load output, one or more of the phases of the six-phase VR may be used also to provide power for the non-CPU MCP device core voltage rail without the need for a separate three-phase VR. Moreover, if a CPU-only MCP is installed and doesn't require a non-CPU MCP device core voltage rail, the inductively coupled load output can be disabled, allowing the six-phase VR to be dedicated entirely to providing power to the CPU die via the CPU die main core voltage rail.

Accordingly, an intelligent Multi-Rail voltage regulator (e.g., ~8 total phases) can be configurable to provision the number of output phases for each of the two MCP core rails depending on the CPU type installed, eliminating cost and board area that would be required to provide separate dedicated VRs for each core voltage rail (e.g., 8 phases+3 phases).

A multi-phase VR with independently configurable control loops can be provided for multiple loads of different operating voltages, such as both CPU and non-CPU MCP core rails. Any number of configurable control loops and phases can be implemented as appropriate. In other embodiments, more than two output rails can be provided.

In accordance with at least one embodiment, at startup the installed CPU type is detected and a preloaded configuration file within the VR controller nonvolatile memory is selected to allocate the number of output rails and phases per rail in a predetermined manner as well as adjust control loop parameters, protection thresholds, and output voltage and current characteristics as needed. CPU type detection may occur before main system and CPU rail power-on via an "out-of-band" systems management agent within an auxiliary voltage ("VAUX") power domain such as a remote access controller, for example, an integrated Dell remote access controller (iDRAC), reading the CPU's VAUX powered processor information read only memory (PIROM), which provides 256 bytes of socket CPU specific configuration information, or may occur after main system and CPU rail power-on by systems management or BIOS reading CPU type control status register (CSR) fields. In embodiments in which the CPU type may not be detected before the main CPU power rails are enabled, the system may startup with a minimum number of rails and phases per rail to allow reading of the CPU type, in a manner which adheres to the safe power sequencing requirements of the CPU and any other MCP die packaged with the CPU. In some of these cases, it may be useful to perform a stubbed power-on to safely read the CPU type, then to perform a power-off and then a full power-on sequence with the now determined VR configuration requirements. In other embodiments, the iDRAC or system management agent may store the CPU configuration in an electrically erasable read only memory (EEPROM) or other non-volatile device so that subsequent power-ons may bypass the CPU detection steps, if it can be determined that the CPU has not been removed or replaced.

VR configuration control may be, but need not be, accomplished via a digital interface such as a power management bus (PMBUS), an inter-integrated-circuit (I2C) bus, or a dedicated general purpose input-output (GPIO) from a system management controller, complex programmable logic device (CPLD), Chipset, or the CPU itself.

Coupled inductors may be used to create a secondary power rail V02 (PVMCP) and simplify the overall VR design. In FIG. 2, L1 and L2 form a coupled inductor. By proper design of the inductor coupling orientation, output of the secondary power rail V02 can obtain some power from power rail V01. Referring back to FIG. 3, the power transfer occurs when Q2, the low-side metal oxide semiconductor field effect transistor (MOSFET) of the voltage regulator providing output voltage V01, is in conduction. An amount of power steered to V02 and the obtained voltage level can be adjusted by changing an inductor coupling coefficient, a L2/L1 turns ratio, as well as the on time of MOSFET switch Q3.

As an example, a 1:1 turns ratio between the two inductors coupled may be used. Alternatively other turns ratios less than or greater than 1:1 can be used. It can be seen that through coupled inductors, at least one embodiment is able to reduce at least one costly MOSFET in creating a regulated VR output V02. At least one embodiment can be extended to multi-phase regulators to increase the VR power capability.

In one embodiment, a subset of the total phases are coupled inductor switching capable. As an example, three of eight phases may have power steered to the secondary voltage rail. Note that in practice 100% of the output power per phase cannot be switched to the secondary rail, but rather a fraction of the power always goes to the first rail.

In another embodiment, every phase is coupled inductor switching capable (e.g., all eight phases of an eight phase VR), and the on time of MOSFET switch Q3 may be adjusted to allow the secondary rail to receive a very low to very high fraction of output power from the VR. Note that this method allows fine grain adjustable power within a range from zero to a maximum level of inductively coupled power.

In accordance with various embodiments, a subsystem with multiple voltage rails and a variety of installable specific configurations or options can be improved with respect to a variety of types of elements connected to the multiple voltage rails (e.g., CPUs, dual inline memory modules (DIMMs), storage drives, input output (IO) slots, platform hub controllers (PCHs), multi-chip package (MCPs), multi-chip modules (MCMs), etc.). As one example, one VR output can be provided to one element, such as a CPU, while another VR output is provided to another element, such as a DIMM, a storage drive, an IO slot, or a PCH. As another example, As one example, one VR output can be provided to one element, such as a CPU, while another VR output is provided to another element, such as a DIMM, a storage drive, an IO slot, or a PCH. As another example, multiple VR outputs, such as one directly connected voltage rail and one inductively coupled voltage rail, can be connected to a single element that uses multiple voltage rails. As another example, different sets of directly connected voltage rails and inductively coupled voltage rails can be provided. For example, a first set of directly connected phases may be joined together to provide a first directly connected voltage rail VR output, a second set of directly connected phases may be joined together to provide a second directly connected voltage rail VR output, a third set of phases may be applied to a first set of inductor primary windings to provide a third directly connected voltage rail VR output, a fourth set of phases may be applied to a second set of inductor primary windings to provide a fourth directly connected voltage rail VR output, a first set of inductor secondary windings magnetically coupled, respectively, to the first set of inductor primary windings can provide a first inductively coupled voltage rail VR output, and a second set of inductor secondary windings magnetically coupled, respectively, to the second set of inductor primary windings can provide a second inductively coupled voltage rail VR output.

The ability to steer an arbitrary fraction of a phase may be of particular value, as it can, for example, provide fine resolution over the allocation of a power supply's power to multiple voltage supply rails in accordance with a system's needs, either on a fixed or dynamically reconfigurable basis.

It should be noted many off the shelf inductors having multiple windings are available with different sizes, ratings, and coupling coefficients. Custom designed inductors having multiple windings with preferred characteristics are also available with very little cost premium relative to single winding inductors.

Compared with traditional buck regulators, at least one embodiment provides an improvement by providing the advantages of simple design and low cost by removing at least one costly MOSFET switch. Compared with other low cost, low performance designs (such as house-keeping/bias supplies), at least one embodiment provides an improvement by providing the advantages of higher performance, for example, by providing a regulated output voltage using a separate control loop to modulate a conduction state of transistor Q3 as shown in FIG. 3 and, as another example, by providing higher efficiency by reducing power dissipation by reducing transistor Q3 body diode conduction time.

At least one embodiment can provide dynamic voltage regulator phase allocation by dynamically configuring phases of a voltage regulator to provide at least a first portion of available power to a first load output and to provide none or a second portion of the available power to a second load output via a coupled inductor. At least one embodiment provides voltage regulator configuration file management to manage a configuration file to configure the load outputs of the voltage regulator to be appropriate for the loads to which they are providing power. For example, voltage regulator multiple configuration file management can be provided to manage multiple configuration files for multiple loads, such as multiple variants of a MCP comprising a CPU, to provide proper load outputs for the power requirements of a load selected from the multiple loads.

In accordance with at least one embodiment, a voltage regulator circuit comprises a plurality of voltage regulator phases, a first load output coupled to the plurality of voltage regulator phases for providing a first output voltage, a first coupling inductor having a first winding and a second winding, the first winding coupled in series between a first voltage regulator phase of the plurality of voltage regulator phases and the first load output, a second load output coupled to the second winding for providing a second output voltage, and a first switch coupled in series with the second winding. In accordance with at least one embodiment, the second output voltage is controlled by controlling a first duty cycle of the first switch. In accordance with at least one embodiment, the voltage regulator circuit further comprises a second coupling inductor having a third winding and a fourth winding, the third winding coupled in series between a second voltage regulator phase of the plurality of voltage regulator phases and the first load output, the second load output coupled to the fourth winding, and a second switch coupled in series with the fourth winding. In accordance with at least one embodiment, the second output voltage is controlled by controlling a first duty cycle of the first switch and a second duty cycle of the second switch. In accordance with at least one embodiment, the first duty cycle and the second duty cycle are equal. In accordance with at least one embodiment, the first duty cycle and the second duty cycle are determined in response to a load configuration parameter value retrieved from a non-volatile memory device. In accordance with at least one embodiment, the first switch is a transistor switch.

In accordance with at least one embodiment, an information handling system comprises a multi-chip package (MCP) comprising a central processing unit (CPU) die and a non-CPU die. The information handling system further comprises a voltage regulator circuit, the voltage regulator circuit comprising a plurality of voltage regulator phases, a first load output coupled to the plurality of voltage regulator phases for providing a first output voltage to the CPU die, a first coupling inductor having a first winding and a second winding, the first winding coupled in series between a first voltage regulator phase of the plurality of voltage regulator phases and the first load output, a second load output coupled to the second winding for providing a second output voltage to the non-CPU die, and a first switch coupled in series with the second winding. In accordance with at least one embodiment, the second output voltage is controlled by controlling a first duty cycle of the first switch. In accordance with at least one embodiment, the voltage regulator circuit further comprises a second coupling inductor having a third winding and a fourth winding, the third winding coupled in series between a second voltage regulator phase of the plurality of voltage regulator phases and the first load output, the second load output coupled to the fourth winding, and a second switch coupled in series with the fourth winding. In accordance with at least one embodiment, the second output voltage is controlled by controlling a first duty cycle of the first switch and a second duty cycle of the second switch. In accordance with at least one embodiment, the first duty cycle and the second duty cycle are equal. In accordance with at least one embodiment, the first duty cycle and the second duty cycle are determined in response to a load configuration parameter value retrieved from a non-volatile memory device.

In accordance with at least one embodiment, a method comprises detecting a startup event to start an information handling system. Then, in response to the detecting the startup event, an installed processor type is determined. In response to the determining the installed processor type, a configuration parameter value pertaining to the installed processor type is retrieved from a non-volatile memory device. Then, in a voltage regulator circuit comprising a plurality of voltage regulator phases, a first output voltage is provided at a first load output coupled to the plurality of voltage regulator phases to provide power to a central processor unit (CPU) die of the installed processor type. Then, in the voltage regulator circuit, wherein the voltage regulator circuit comprises a first coupling inductor having a first winding and a second winding, the first winding coupled in series between a first voltage regulator phase of the plurality of voltage regulator phases and the first load output, a second output voltage is provided at a second load output coupled to the second winding to provide power to a non-CPU die. Then, a first duty cycle of a first switch coupled in series with the second winding is controlled to control the second output voltage.

In accordance with at least one embodiment, a multi-chip package (MCP) comprises the CPU die and the non-CPU die. In accordance with at least one embodiment, the voltage regulator circuit further comprises a second coupling inductor having a third winding and a fourth winding, the third winding coupled in series between a second voltage regulator phase of the plurality of voltage regulator phases and the first load output, the second load output coupled to the fourth winding and a second switch coupled in series with the fourth winding, the method further comprising controlling a first duty cycle of the first switch and a second duty cycle of the second switch to control the second output voltage. In accordance with at least one embodiment, the controlling the first duty cycle of the first switch and the second duty cycle of the second switch comprises controlling the first duty cycle and the second duty cycle to be equal. In accordance with at least one embodiment, the first duty cycle and the second duty cycle are determined in response to a load configuration parameter value retrieved from a non-volatile memory device. In accordance with at least one embodiment, the retrieving a configuration parameter value pertaining to the installed processor type from a non-volatile memory device is performed by powering the non-volatile memory device with an auxiliary voltage not dependent on the configuration parameter value. In accordance with at least one embodiment, the first switch is a transistor switch.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A voltage regulator circuit comprising: a plurality of voltage regulator phases; a first load output coupled to the voltage regulator phases for providing a first output voltage; a first coupling inductor having a first winding and a second winding, the first winding coupled in series between a first voltage regulator phase of the voltage regulator phases and the first load output; a second load output coupled to the second winding for providing a second output voltage; and a first switch coupled in series with the second winding; a second coupling inductor having a third winding and a fourth winding, the third winding coupled in series between a second voltage regulator phase of the plurality of voltage regulator phases and the first load output, the second load output coupled to the fourth winding; and a second switch coupled in series with the fourth winding.

2. The voltage regulator circuit of claim 1, wherein the second output voltage is controlled by controlling a first duty cycle of the first switch.

3. The voltage regulator circuit of claim 1, wherein the second output voltage is controlled by controlling a first duty cycle of the first switch and a second duty cycle of the second switch.

4. The voltage regulator circuit of claim 3, wherein the first duty cycle and the second duty cycle are equal.

5. The voltage regulator circuit of claim 3, wherein the first duty cycle and the second duty cycle are determined in response to a load configuration parameter value retrieved from a non-volatile memory device.

6. The voltage regulator circuit of claim 1, wherein the first switch is a transistor switch.

7. An information handling system comprising: a multi-chip package (MCP) including a central processing unit (CPU) die and a non-CPU die; and a voltage regulator circuit, the voltage regulator circuit including: a plurality of voltage regulator phases; a first load output coupled to the voltage regulator phases for providing a first output voltage to the CPU die; a first coupling inductor having a first winding and a second winding, the first winding coupled in series between a first voltage regulator phase of the voltage regulator phases and the first load output; a second load output coupled to the second winding for providing a second output voltage to the non-CPU die; and a first switch coupled in series with the second winding; the voltage regulator circuit further comprises: a second coupling inductor having a third winding and a fourth winding, the third winding coupled in series between a second voltage regulator phase of the plurality of voltage regulator phases and the first load output, the second load output coupled to the fourth winding; and a second switch coupled in series with the fourth winding.

8. The information handling system of claim 7, wherein the second output voltage is controlled by controlling a first duty cycle of the first switch.

9. The information handling system of claim 7, wherein the second output voltage is controlled by controlling a first duty cycle of the first switch and a second duty cycle of the second switch.

10. The information handling system of claim 9, wherein the first duty cycle and the second duty cycle are equal.

11. The information handling system of claim 9, wherein the first duty cycle and the second duty cycle are determined in response to a load configuration parameter value retrieved from a non-volatile memory device.

12. A method comprising: detecting a startup event to start an information handling system; in response to the detecting the startup event, determining an installed processor type; in response to the determining the installed processor type, retrieving a configuration parameter value pertaining to the installed processor type from a non-volatile memory device; in a voltage regulator circuit including a plurality of voltage regulator phases, providing a first output voltage at a first load output coupled to the voltage regulator phases to provide power to a central processor unit (CPU) die of the installed processor type; in the voltage regulator circuit, wherein the voltage regulator circuit includes a first coupling inductor having a first winding and a second winding, the first winding coupled in series between a first voltage regulator phase of the voltage regulator phases and the first load output, providing, at a second load output coupled to the second winding, a second output voltage to provide power to a non-CPU die; and controlling a first duty cycle of a first switch coupled in series with the second winding to control the second output voltage; the voltage regulator circuit further comprises a second coupling inductor having a third winding and a fourth winding, the third winding coupled in series between a second voltage regulator phase of the plurality of voltage regulator phases and the first load output, the second load output coupled to the fourth winding and a second switch coupled in series with the fourth winding, the method further comprising: controlling a first duty cycle of the first switch and a second duty cycle of the second switch to control the second output voltage.

13. The method of claim 12, wherein a multi-chip package (MCP) comprises the CPU die and the non-CPU die.

14. The method of claim 12, wherein the controlling the first duty cycle of the first switch and the second duty cycle of the second switch comprises: controlling the first duty cycle and the second duty cycle to be equal.

15. The method of claim 12, wherein the first duty cycle and the second duty cycle are determined in response to a load configuration parameter value retrieved from a non-volatile memory device.

16. The method of claim 12, wherein the retrieving a configuration parameter value pertaining to the installed processor type from a non-volatile memory device is performed by powering the non-volatile memory device with an auxiliary voltage not dependent on the configuration parameter value.

17. The method of claim 12, wherein the first switch is a transistor switch.

* * * * *